July 18, 1972   C. L. WEBER ET AL   3,677,716
PHASE SEPARATION OF A GAS-LIQUID-SOLID MIXTURE
Original Filed June 14, 1968   2 Sheets-Sheet 1
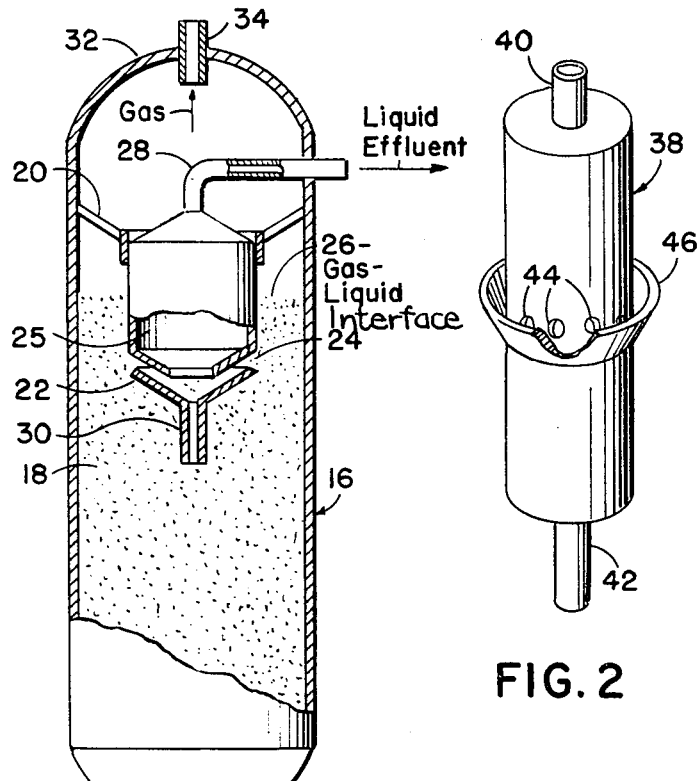
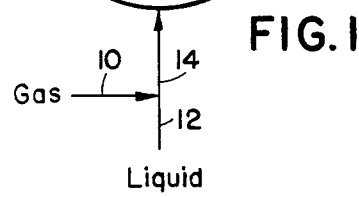
FIG. 1
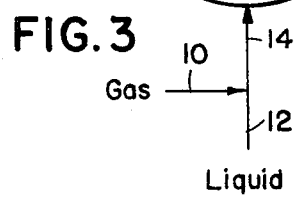
FIG. 3
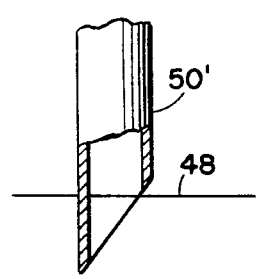
FIG. 3A
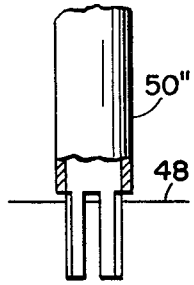
FIG. 3B
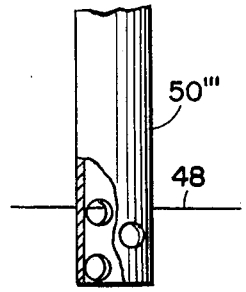
FIG. 3C

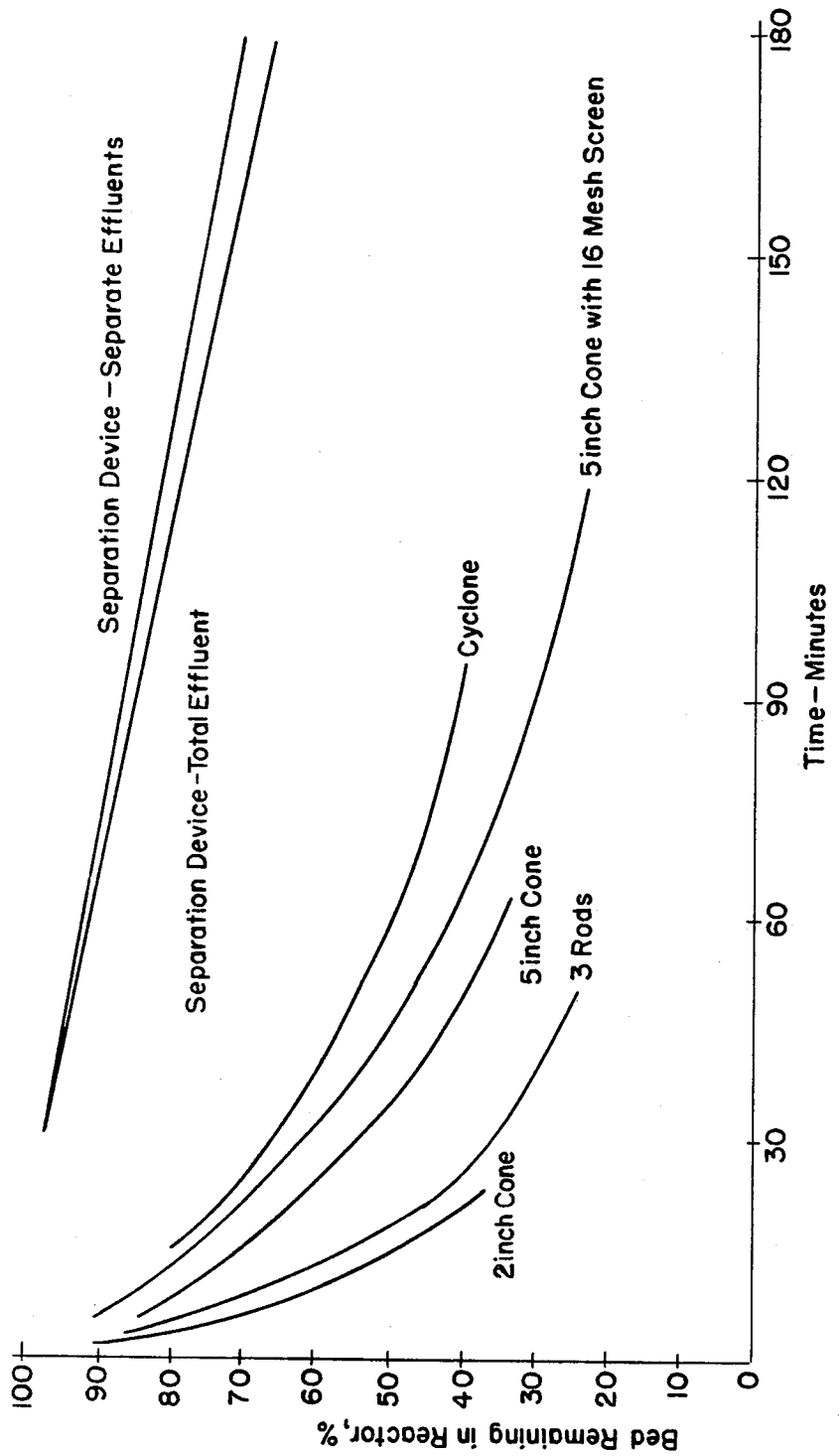

United States Patent Office 3,677,716
Patented July 18, 1972

3,677,716
PHASE SEPARATION OF A GAS-LIQUID-SOLID MIXTURE
Carl L. Weber, Washington Crossing, Pa., and Ronald H. Wolk, Lawrence Township, Mercer County, and Michael C. Chervenak, Pennington, N.J., assignors to Hydrocarbon Research, Inc., New York, N.Y.
Original application June 14, 1968, Ser. No. 737,156. Divided and this application Nov. 18, 1970, Ser. No. 90,761
Int. Cl. C01g 1/00, 13/18, 23/06
U.S. Cl. 23—288 E
16 Claims

ABSTRACT OF THE DISCLOSURE

Apparatus for improved separation of liquids, gases and particulate solid materials in a liquid-gas contacting process wherein a liquid feed and gas usually hydrogen are passed upwardly through a bed composed of a particulate contact agent, the velocity of the gas and the liquid being such that the particles are put in a state of random motion and the volume of the bed is expanded over its static volume and wherein an area of high liquid gas and liquid turbulence and mixing is created and wherein liquid effluent and gaseous effluents are removed from the contact zone. The method consists of effecting essentially complete disengagement of the gas from the mixture of particulate solids and liquid. The gas-free liquid-solid mixture is then introduced to a zone of relatively low turbulence and liquid is then removed from this zone at a rate whose linear velocity is less than the settling velocity of the solid, thereby allowing substantial settling of the solid and resulting in the removal of a clarified liquid. The disengaged gaseous effluent may then be removed separately or recombined and removed with the liquid effluent. Apparatus for efficiently carrying out this process are described.

---

This is a division of application Ser. No. 737,156, filed June 14, 1968, now U.S. Pat. No. 3,622,265, issued Nov. 23, 1971.

BACKGROUND OF THE INVENTION

This invention pertains to the field of separation of gases, liquids and solids from a mixture thereof. More particularly, it relates to those gas-liquid contacting processes of the type wherein a liquid feed and gas are passed upwardly through a bed of particulate solids contacting agent. As a result of the velocities of the liquid and gas, the bed is expanded to a volume over that of its static volume and the particles are put in a state of random motion. Such systems are known as ebullated contacting beds.

Processes of this type normally involve the contacting of a hydrogen-rich gas with a carbon containing feed material with a particulate solid to effect either conversion of the feed to more useful products and/or to achieve hydropurification, i.e., removal of sulfur, nitrogen and other impurities susceptible to hydrogenative treatment. Carbon containing feeds which are normally so treated include predominantly hydrocarbon materials, such as residua, gas oils, distillates, reduced crudes, tar sand extracts, coal tar and coal tar extracts and liquid hydrocarbons derived from coal in addition to oxygen containing organic materials, such as lignin and oils and fats including triglycerides of alcohols from said fats. While such hydrogenation processes may be carried out in the presence of a non-catalytic particulate solid, it is most usual to utilize a catalyst selected from the class consisting of alumina and silica and alumina promoted with metals and compounds of metals selected from Groups VIb and VIII of the periodic table. The preferred conditions for carrying these type processes are temperatures in the range from about 600° F. to about 900° F., pressures in the range from about 300 to about 5000 p.s.i.g., and space velocities greater than about 0.25 $V_f/hr./V_r$.

The use of the ebullated bed contacting system as described above, has resulted in numerous advantages to the petroleum processing field, particularly with respect to increased distillate yields, longer periods of operability, improved temperature control and temperature uniformity across the reaction zone, increased catalyst life, etc.

A major characteristic of these systems is that while there is bed expansion and turbulent intermixing of the phases within the reaction zone, most of the particulate solids are retained in the reaction zone with relatively little carryover of solids in the liquid. In fact, the ebullated bed is usually described as having a well defined interface below which the solids concentration is substantially higher than that above the interface.

Recently, it has also been disclosed that improved and unexpected results may be realized by using powdered solids having a narrow size distribution within the range from about 20 to about 325 mesh, as opposed to the larger extrudate type solids. Such powdered catalyst systems present a problem, however, with respect to excessive solids carryover and decreased retention of solids in the reaction zone. In such processes, therefore, it has been necessary to increase the reactor volume such that there is a fairly large segment of the reactor above the interface, said portion acting as a disengagement zone or settling zone for the solids. While it has been possible to optimize liquid and gas velocities, liquid and solids densities, etc., so as to further minimize the solids carryover, these efforts have been ineffective towards advancing the economic feasibility of these processes. Thus, the higher solids loss observed with powdered systems, tend to offset the advantages that are obtained from the use thereof to such an extent that the larger extrudate type solids are used predominantly in the commercial systems now in use or being designed.

SUMMARY OF THE INVENTION

We have discovered that a substantial reduction in the amount of solids carryover in the liquid effluent of the systems described above, can be achieved by first disengaging or separating the gaseous component from the reaction mixture, and then introducing the gas-free dilute liquid-solid slurry so produced to a zone of low turbulence, removing the liquid therefrom at a rate that is equivalent to a linear velocity below the settling rate of the solids.

We have further discovered devices which allow the above catalyst disengagement process to be carried out within the confines of the reactor, without substantial interference with the other process conditions being used. The devices disclosed hereinafter may be used in processes wherein a total gaseous and liquid effluent is removed or wherein the gaseous effluent is removed separately from the liquid effluent. Furthermore, the use of our invention reduces the amount of solids disengaging space normally required in the powdered solids systems, thereby decreasing the overall coat of such systems and allows increased throughputs to be used without the consequence of additional solids carryover.

We have found that in powdered solids ebullated systems, a major portion of the solids are retained in a zone with little change in solids concentration from the bottom to the top. Above the zone, however, a concentration gradient exists wherein the concentration of solids decreases as the effluent exit is approached.

While a total effluent. i.e., gas and liquid products combined, may be removed and subjected to separation external of the reactor, it is also typical to separate the gaseous and liquid products within the reactor and remove them separately. In either type system, however, the reaction mixture is in a highly turbulent state at the point of liquid removal due to, first—the relatively high liquid velocities in that area, second—the continuous and profuse bubbling of gas through the liquid. Thus, a truly random mixture of liquid, gas and solid exists.

We have further found that the presence of the gaseous bubbles has a major effect on the turbulence of the mixture and this turbulence greatly offsets the density difference between the solids and the liquid and, thus, interferes with the settling rate of the solids from the liquid. As a result, it is not sufficient simply to put the mixture in a zone of low turbulence, because the gas therein will be continually disengaging therefrom and will inherently cause turbulence. We, therefore, have found that the entrained gas must necessarily be removed before any condition favorable to solids separation can be created.

Once the gas has been removed, however, turbulence of the liquid is decreased to a level where the density difference between the solid and the liquid can effect settling. We have discovered that this level of turbulence exists when removing the solids-free liquid from the gas free dilute slurry at a rate less than the solids settling rate. Usually, it is most desirable to confine the dilute slurry in a zone away from that containing the turbulent mixture and to effect the settling within this zone. When the liquid velocity is below the solids settling rate, the liquid drawn off is quite free of solid material and may be removed directly for further downstream treatment. The settled solids which are highly concentrated and in the form of a concentrated slurry may then be reintroduced to the highly turbulent zone in the reactor.

Additionally, within the scope of the inventive process disclosed above, we have invented apparatuses which allow the above process to be carried out in the sequence described within a high pressure reaction vessel used to carry out the heretofore mentioned ebullated contacting processes.

While the exact nature of the apparatus depends on whether a total effluent or separate gaseous and liquid effluents are removed from the reaction zone, the basic requirements in each systems are the same. There is, however, an additional problem with the removal of a total effluent since the gas must first be separated in order to allow the proper conditions for settling to be obtained as described above, and then must be recombined with the solids free liquid prior to removal. We have found a method and apparatus for carrying out that method whereby the recombination of the gas and solids free liquid produces insignificant turbulence such that the recombination does not disturb the solids settling process.

Particularly, the apparatus of our invention gives minimum solids carryover when used in combination with high pressure reaction vessels which are adapted for reacting liquid feed materials with a hydrogen rich gas at high temperatures and pressures. These vessels usually have means for withdrawal of liquid and gaseous effluents and the disengaging apparatus is normally affixed in the upper portion of the reactor.

DESCRIPTION OF THE DRAWING

FIG. 1 is a partial vertical cross-section and schematic of a reactor containing a disengagement apparatus for separate removal of gaseous and liquid effluents.

FIG. 2 is a perspective view of a disengagement apparatus for separate removal of gaseous and liquid effluents.

FIG. 3 is a partial vertical cross-section and schematic of a reactor containing a disengagement apparatus for removal of a total effluent.

FIGS. 3A, 3B and 3C are partial vertical cross-sections of various modifications of the total effluent exit pipe of FIG. 3.

FIG. 4 is a graph comparing catalyst retention as a function of time for various types of separation devices and the disengagement process and apparatus of the invention.

DESCRIPTION OF THE PREFERRED EMBODIMENT

The inventive concept of our discovery is illustrated and delineated in the drawings as follows:

FIG. 1 shows a typical high pressure reaction vessel and the placement of the disengagement apparatus as described hereafter in said vessel. Processes of the type utilizing our invention may be described as follows. A liquid feed material at 12 is fed together with a gas, usually hydrogen, at 10 through line 14 and into reactor 16, which contains a bed of particulate solids 18 and the disengagement device which is held in place by support members 20. The solids may have a narrow size distribution within the range from about 20 to about 325 mesh on the U.S. scale, or may be in the form of extrudates having diameters between $\frac{1}{32}$ and $\frac{1}{8}$ inch.

The gas and liquid feed are passed upwardly through the bed to expand it and place the particles in random motion. A disengaged gas space 32 exists at the top of the reactor and the remainder of the reactor volume below interface 26 is filled with the turbulent gas-liquid-solid mixture. This mixture is continually swept past gas disengagement surface 22. The gaseous bubbles impinge upon this surface and because of the obliqueness of the surface, are directed upwardly and outwardly towards the wall of the vessel. The gas passes up through the gas mixture interface 26 to space 32. Surface 22 essentially acts to disengage the gas from the mixture since it directs the gas away from dilute slurry entrance 24. The gas-free dilute slurry is swept into dilute slurry entrance 24 by the turbulent forces and velocities within the reactor and thereby enter settling chamber 25. The liquid-solid slurry contained within the chamber is substantially out of contact with the highly turbulent zone, i.e., except for the contact established through the dilute slurry entrance. As a result of the relative calm of the slurry contained in settling chamber 25, the particulate solids contained therein settle at a rate which is dependent upon the relative density of the solid to the liquid, the particle size of the solids, the viscosity of the liquid, and the upward liquid velocity in the chamber. The settled particulate solids leave the chamber as a concentrated slurry through exit 30 and enter the turbulent zone. The solids-free liquid effluent is removed through exit 28 from the reactor and the gaseous effluent is removed through line 34.

It is important to note that the main parameter affecting the ability of the solids to settle is the turbulence of the area around the solids and not necessarily the liquid velocity per se. Thus, by removing the gas from the mixture prior to solids settling, it is possible to remove the liquid effluent from the settling chamber at a velocity equal to or greater than the liquid velocity within the reaction system itself. It is only necessary that this settling chamber velocity be less than the settling rate of the solids.

The disengagement device discussed above is for use when it is desired to remove the gaseous and liquid effluents separately. As shown in FIG. 1, this device consists first of a gas disengaging means 22 usually being constituted by a baffle or sheet-like surface having relatively large cross-sectional area to induce a deflective force to the bubbles. In the case shown, a funnel type member is most convenient and suitable for this purpose.

The settling chamber 25 has a lower portion in the shape of truncated cone with the wider end upward and an upper portion having a cylindrical shape. An exit pipe 28, opens perpendicularly into the top of the chamber. While the drawing shows a continuous necking down from the cylindrical portion to the pipe, this is not a critical requirement in this modification. The lower part of the chamber is partially inserted into the top of a cone shaped member 22, but is spaced from the inner side of the cone 22 to leave an annular passage which acts as the dilute slurry entrance. The cone has a hollow stem attached to the bottom such that the stem constitutes the concentrated slurry exit.

Numerous modifications may easily be devised with respect to the design and formation of the device. The main requirements of the chamber is that it have a dilute slurry entrance or entrances and an exit for removing solids-free liquid and an exit for removing a concentrated slurry resulting from the settling of the particulate solid. In the device shown, the upper cylindrical member is affixed to the lower funnel member by connecting and support means which are not illustrated for the sake of clarity. It is not necessary, of course, that the slurry entrances be a continuous opening, but may be simply separate apertures leading to the interior of the settling chamber or tangential openings.

The device must also have means to direct the disengaged gas away from the dilute slurry entrances. This is most easily accomplished as shown by having the disengaging surface directed away from the dilute slurry entrances. In the case, however, where the disengaging means is separate and apart from the device as a whole, it is relatively easy to design the disengaging surfaces so as to direct the disengaged gas away from the dilute slurry entrances. Of course, it is possible, if desired, to have separate disengagement and directing means.

FIG. 2 shows a second mode of embodiment of the device and illustrates the manner in which the above mentioned basic components may be incorporated into another design. Here, the device consists of a cylindrical zone 38 which constitutes the settling chamber having a solids-free liquid exit 40 at the top and a concentrated slurry exit 42 at the bottom and dilute slurry entrances 44 circumferentially disposed about the middle of the cylinder. A beveled lip 46 is attached to the cylinder just below the dilute slurry entrances, which completely circumscribes the circumference of the cylinder, said lip forming an acute angle with respect to the cylinder surface such that it would direct any impinging gas bubbles which had been disengaged by the lower surface of the cylinder away from the dilute slurry entrances. Thus, while many particular designs of the disengagement device are possible, in order to achieve the desired result, only those basic components as described are necessary.

FIG. 3 shows a device in a reaction vessel where the liquid and gaseous effluents are removed from the vessel together. This device differs from that shown in FIGS. 1 and 2 only in that it has an inlet 27 in the upper portion of the chamber, i.e., that portion which is above the gas liquid interface 26. This inlet in the case shown is formed simply by leaving the top of the settling chamber open. Other variations are apparent such as having slits, apertures, etc. in the upper portion of the chamber. It is only important that the inlet be sufficiently large so that the gas easily enters the chamber.

The manner in which the gas is directed away from the dilute slurry entrances 24 has been described heretofore. The disengaged gas bubbles pass through interface 26 and into the gas space 32. The disengaged gas then freely enters the chamber through gas inlet 27. Thus, a gas liquid interface 48 is formed within the chamber. As a result of the density difference in the fluids in the two zones, the level of interface 48 is lower than that of interface 26.

Solids free liquid is withdrawn through exit tube 50 from chamber 25 at a rate such that the linear velocity in chamber 25 is below the solids settling rate. Tube 50 extends into chamber 25 and its lowest point determines the level of interface 48 with the overall result that a mixed, total effluent of gas and liquid is removed through tube 50.

Ordinarily, it will be found that the gas in zone 32 will tend to depress interface 48 and permit gas to enter the end of tube 50. Thus, the flow of liquid and gas is self-regulating and a uniform, continuous flow of gaseous and liquid effluents is removed through tube 50.

Additionally, we have found that a smoother flow of gaseous and liquid effluents through tube 50 can be obtained by adapting the lower end of said tube with traverse openings with several levels of entrance into the tube such that gaseous effluent may pass directly through the openings into the exit tube. Various modes of such openings are shown in FIGS. 3A, 3B and 3C.

Particularly, FIG. 3A shows tube 50' having a beveled opening whereby a portion of the opening is available to the gaseous effluent at all times even with fluctuations in the level of interface 48. FIG. 3B shows tube 50" having a slotted opening and FIG. 3C shows tube 50''' having a plurality of vertically spaced holes.

While the dimensional relationships of the disengagement device to the internal volume and diameter of the reaction vessel are not critical, there are preferential dimensions which are described below. Theoretical and practical considerations require that the diameter of the device be sufficiently less than the diameter of the reactor such that the annular space between the outside of the disengagement device and the inside wall of the reactor is large enough to allow liquid slurry and gas mixture to easily pass through the space without resulting in extraordinarily high gas-liquid velocities. Naturally, the liquid velocity in the annular space will be greater than that in the reactor segment contained below the disengagement device, since the feed rate and withdrawal rate remain constant. Particularly, we have found that improved flow into the dilute slurry entrance can be effected by having the diameter of the cylindrical portion of the chamber not less than the greatest diameter of the cone. While the dimensional relationships of various components of the device to one another are not critical to the operation of the device, such relationships may be optimized extracting maximum efficiency. Once the basic mechanism of our invention is understood, however, such optimization is simply a matter of experimental determination.

EXAMPLE I

| | |
|---|---|
| Reactor diameter, inches | 6 |
| Disengager diameter, inches | 4.25 |
| Disengager height, inches | 7 |
| Reactor gas velocity, ft./sec. | 0.10 |
| Reactor liquid velocity, ft./sec. | 0.0098 |
| Disengager liquid velocity, ft./sec. | 0.0196 |
| Disenger residence time, sec. | 29.76 |
| Liquid density g./cc. at 60° F. | 0.73 |
| Liquid viscosity, cp. | 0.25 |
| Particulate solid: | |
|    Absolute density | 3.2 |
|    Size, mesh | 50–270 |
| Solids settling rate, (in absence of gas), ft./sec. | 0.02–0.05 |

Example I gives the details of the conditions used for the comparison shown in FIG. 4. The only difference between each of the runs shown is the type of device used. FIG. 4 shows graphically a comparison of the solids bed retention obtained with the process of the invention using both type devices as described above and other types of disengagement devices. The particular devices compared in FIG. 4 are as follows:

(1) Cones—a 2 inch and 5 inch cone which consists essentially of a funnel with a maximum cone diameter as designated. In one case, the 5 inch cone had a 16 mesh screen below the cone to alter gas bubble speed and size.

(2) 3 vertical rods—the use of vertical rods has given advantageous results for gas disengagement in fluidized systems, i.e., systems containing only gas and particulate solids. In the case shown, however, it is demonstrated that such mechanism does not operate to advantage in the ebullated bed system.

(3) Liquid cyclone.

As shown in FIG. 4, the particulate solids loss from the bed was only about 7% of the bed per hour of operation when utilizing the separation devices and process of the invention. The next best device, the cyclone, lost 50% of the bed in the first hour of operation with the percentage loss diminishing as more of the bed passed overhead.

In addition to the processes heretofore described, our invention is uniquely applicable to multiple stage systems which have been found to give certain advantages with respect to increased yields of products and improved operability. It is usual, for instance, to incorporate two or more reaction zones in series with the total effluent from each going to the next subsequent reaction zone. Alternately, multiple stage systems have been operated wherein the gaseous and liquid effluents are removed separately from each stage and only the liquid effluent is passed onto the next subsequent stage with the gaseous effluents from each stage being combined and treated as a reaction product. A third modification is the removing of a total, combined gaseous and liquid effluent from the first stage, introducing this to the second stage and removing separate gaseous and vaporous effluents from the second stage. This particular combination has resulted in somewhat superior sulfur removal when used in a hydrodesulfurization of a petroleum residuum feed material.

Generally, the use of our invention gives substantial advantages in multiple stage catalytic systems because of the absence of contaminated catalyst carryover into the next subsequent stage.

Thus, we have discovered a unique method for reducing the solids carryover in a system utilizing the ebullated bed contacting method. At the same time, we have discovered a device which allows one to carry out the method of our invention with great convenience and efficiency. It is understood, of course, that while in the example cited above, the results given are those for an experimental size unit, they are applicable in all respects to commercial size units, said application being only a matter of engineering scale-up.

While we have shown a preferred form of embodiment of my invention, we are aware that modifications within the scope and spirit of our invention will occur to those skilled in the art, and such modifications are contemplated to be within the scope of the claims appended hereinafter.

We claim:

1. In combination with a high pressure reaction vessel adapted for the reacting of a liquid feed material with a hydrogen rich gas at high temperatures and pressures in the presence of a bed composed of a particulate solid contacting agent, said reaction being the type wherein the gas and liquid feed materials are passed upwardly through the bed at velocities whereby the bed is expanded to a volume greater than its static volume and the particulate solid is put in a state of random motion and wherein the mixture of liquid, gas and solids constitute a turbulent zone wherein minimum solids settling takes place and wherein there exists a liquid-gas interface above which only a gaseous phase exists and wherein the reaction vessel has means to withdraw both liquid and vaporous effluents therefrom, the improvement which comprises a disengaging device affixed in the upper portion of the vessel for separating the gaseous, liquid and solid materials from one another, said device being composed of:

(a) gas disengaging means;
(b) a solids settling chamber having a dilute slurry entrance and separate solids-free liquid and concentrated slurry exits, said chamber being enclosed such that liquid and solids within the chamber are substantially out of contact with the turbulent zone, and being positioned such that the dilute slurry entrance is below said liquid gas interface and;
(c) means to direct the disengaged gas away from the dilute slurry entrance whereby the amount of gas entering the settling chamber through the entrance is minimized and whereby the liquids and solids within the chamber constitute a quiescent zone wherein substantial solids settling takes place such that a concentrated slurry and a solids-free liquid are formed and can be removed through their respective exits.

2. The apparatus as claimed in claim 1 wherein the gas disengaging means consist of a baffle-like surface having a large surface area, said surface being positioned in such a manner relative to the dilute slurry entrance that the gas diverted by the surface is directed away from the entrance.

3. The apparatus as claimed in claim 1 wherein the device comprises:

(a) a cylinder having a solids-free liquid exit at the top and a concentrated slurry exit at the bottom and dilute slurry entrances circumferentially disposed about the middle of the cylinder and;
(b) a beveled lip attached to the cylinder just below said dilute slurry entrance, said lip completely circumscribing the circumference of the cylinder and forming an acute angle with respect to the cylinder surface whereby said lip directs gas disengaged by the cylinder surface below said lip away from the dilute slurry entrances.

4. The apparatus as claimed in claim 1 wherein the chamber has a disengaged gas inlet positioned above the liquid-gas interface in the reaction vessel for entrance of disengaged gas into the chamber whereby a liquid-gas interface is created in the chamber and wherein the solids-free exit consists of an exit pipe having an upper end which is connected with the liquid and vapor withdrawal means of the reaction vessel and having a lower end which extends into the settling chamber to the liquid-gas interface.

5. The apparatus as claimed in claim 4 wherein the lower end of the exit pipe is adapted with a traverse opening making available several levels of entrance into the tube.

6. The apparatus as claimed in claim 5 wherein the lower end of the exit pipe has a beveled opening.

7. The apparatus as claimed in claim 5 wherein the lower end of the exit pipe has a slotted opening.

8. The apparatus as claimed in claim 5 wherein the lower end of the exit pipe has a plurality of vertically spaced holes.

9. The apparatus as claimed in claim 1 wherein the settling chamber has a lower portion having a truncated conical shape with the wider end upward and an upper portion having a cylindrical shape and an exit pipe opening perpendicularly into the top of the chamber for removing material therefrom, said pipe constituting the solids-free liquid exit and wherein the device further comprises an upright funnel consisting of a cone and hollow stem attached thereto, the lower part of the chamber being inserted partially into the top of said cone, but spaced from the inner side of said cone to leave an annular passage between the cone and the chamber, whereby the outside of the cone constitutes the gas disengaging and directing means, the annular passage constitutes the dilute slurry entrance and the hollow stem constitutes the concentrated slurry exit.

10. The apparatus as claimed in claim 9 wherein the diameter of the cylindrical portion of the chamber is not less than the greatest diameter of the cone.

11. The apparatus as claimed in claim 9 wherein the chamber has a disengaged gas inlet in the upper cylindrical portion above the liquid-gas interface in the reaction vessel for entrance of disengaged gas into the chamber whereby a liquid-gas interface is created in the chamber and wherein the exit pipe is connected with the liquid and vapor withdrawal means of the vessel and wherein the exit pipe extends into the chamber to a point just at the liquid-gas interface in the chamber.

12. The apparatus as claimed in claim 11 wherein the diameter of the cylindrical portion of the chamber is not less than the greatest diameter of the cone.

13. The apparatus as claimed in claim 11 wherein the lower end of the exit pipe is adapted with a traverse opening making available several levels of entrance into the tube.

14. The apparatus as claimed in claim 13 wherein the lower end of the exit pipe has a beveled opening.

15. The apparatus as claimed in claim 13 wherein the lower end of the exit pipe has a slotted opening.

16. The apparatus as claimed in claim 13 wherein the lower end of the exit pipe has a plurality of vertically spaced holes.

References Cited
UNITED STATES PATENTS

| | | | |
|---|---|---|---|
| 3,124,518 | 3/1964 | Guzman et al. | 208—213 X |
| 3,151,060 | 9/1964 | Garbo | 208—213 |
| 3,271,301 | 9/1966 | Galbreath | 208—216 X |

MORRIS O. WOLK, Primary Examiner

R. E. SERWIN, Assistant Examiner

U.S. Cl. X.R.

23—1 F, 284, 288 S; 196—46; 208—213